United States Patent [19]
Cobb, Jr.

[11] 3,913,980
[45] Oct. 21, 1975

[54] DYNAMIC WHEEL AND TIRE BALANCING APPARATUS

[76] Inventor: Albert H. Cobb, Jr., 5515 Slattery Drive, San Antonio, Tex. 78240

[22] Filed: Sept. 9, 1974

[21] Appl. No.: 504,142

[52] U.S. Cl................................ 301/5 BA; 74/573
[51] Int. Cl.²........................................... B60B 1/00
[58] Field of Search............ 301/5 BA; 74/573, 574

[56] References Cited
UNITED STATES PATENTS

| | | | |
|---|---|---|---|
| 3,006,690 | 10/1961 | Pierce | 301/5 BA |
| 3,733,923 | 5/1973 | Goodrich | 301/5 BA |

*Primary Examiner*—M. Henson Wood, Jr.
*Assistant Examiner*—D. W. Keen

[57] ABSTRACT

The invention comprises a user installable system of improved automobile wheel and tire dynamic balancing apparatus selectively positioned in the central longitudinal groove-way cavity of the wheel rim for a pneumatic tire.

34 Claims, 7 Drawing Figures

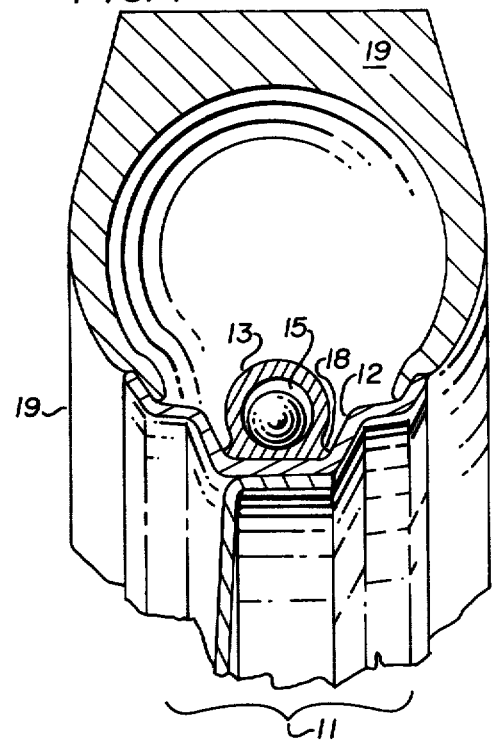
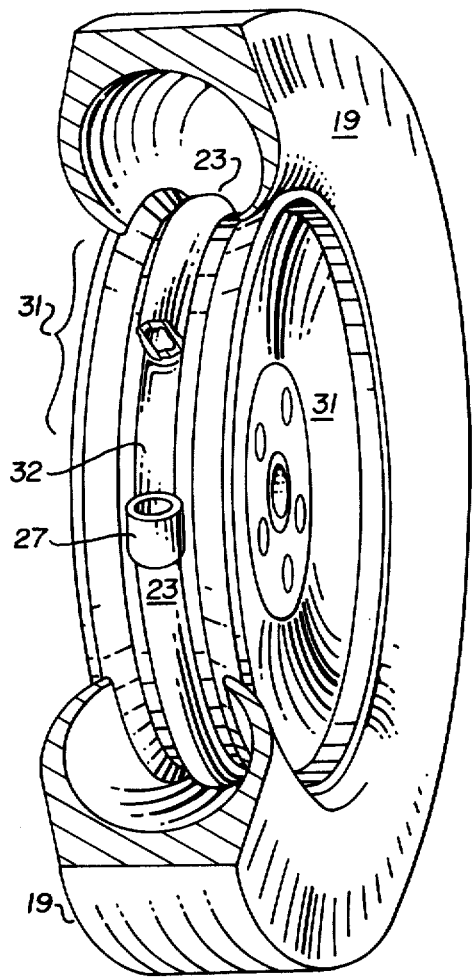
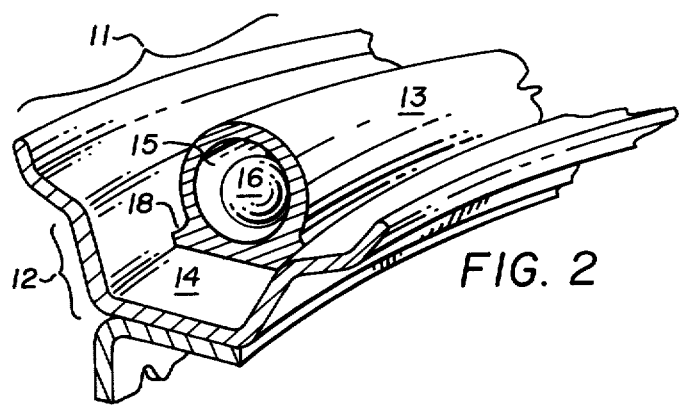
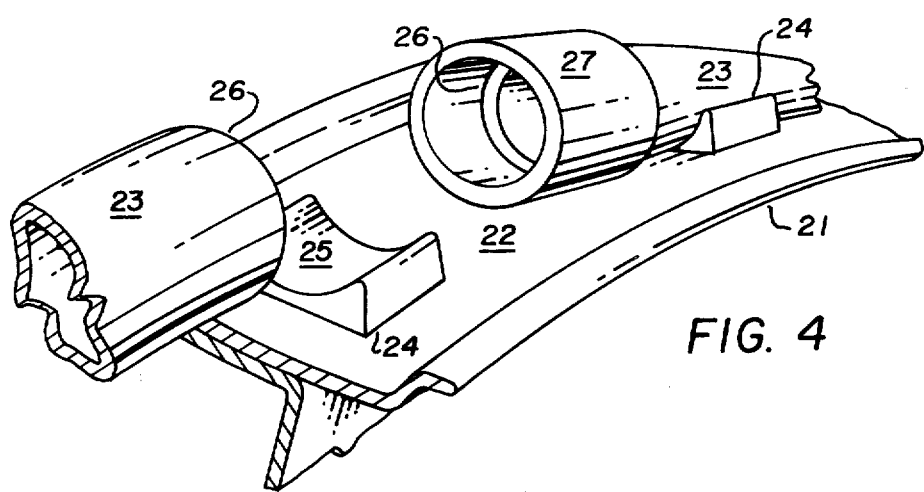

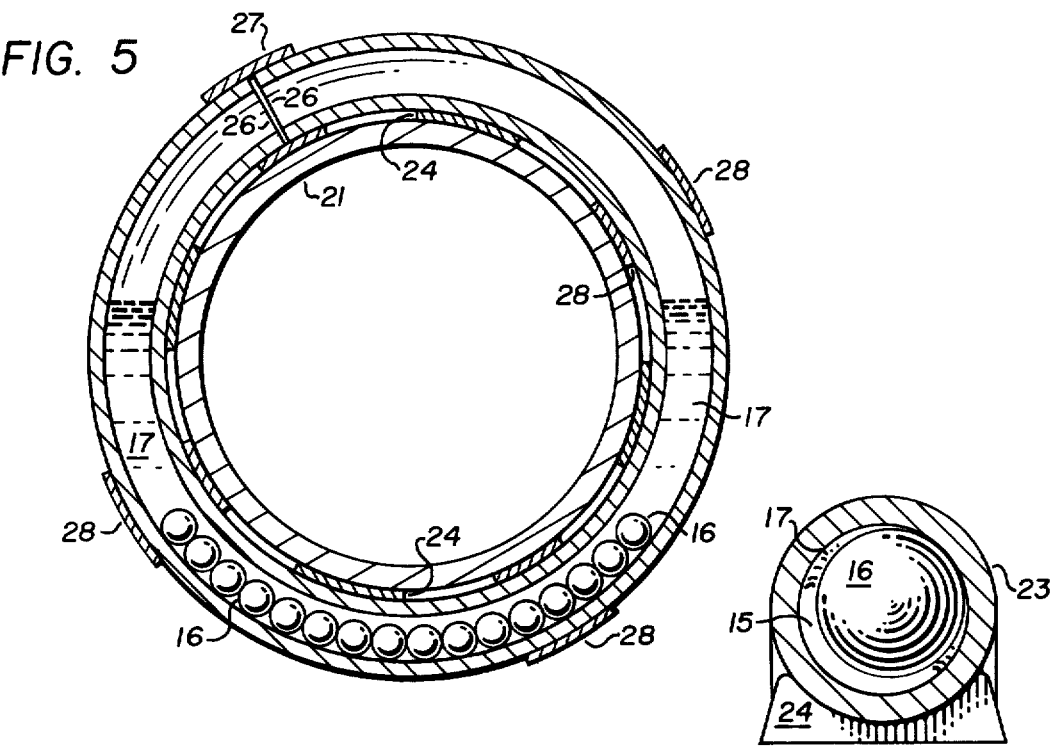
FIG. 5
FIG. 6
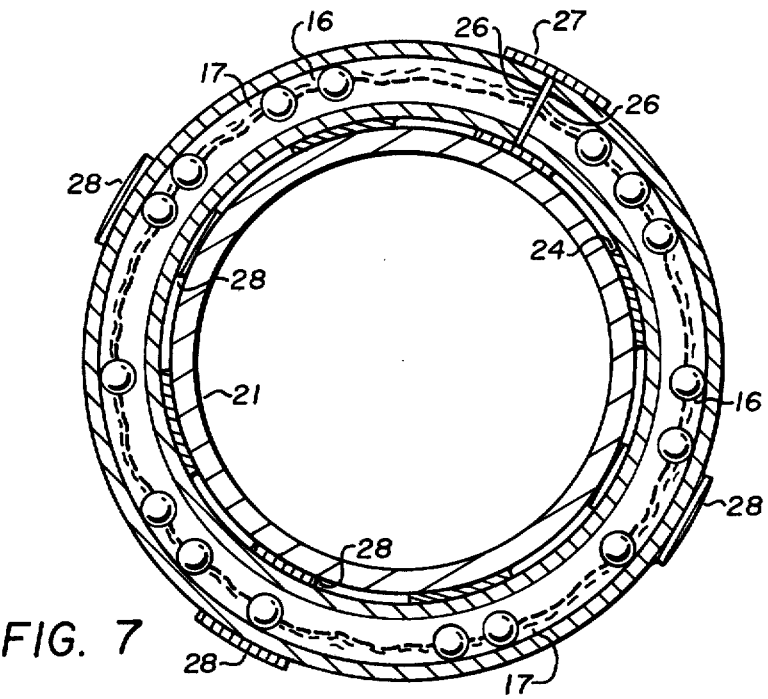
FIG. 7

DYNAMIC WHEEL AND TIRE BALANCING APPARATUS

SUBJECT MATTER OF THE INVENTION

The invention relates generally to wheel balancing devices and apparatus and more specifically relates to dynamic wheel balancing apparatus relying upon selective positioning and a combination of plural balancing features to provide improved wheel balancing performance.

OBJECTS OF THE INVENTION

An object of the Invention is to provide an improved wheel balancing apparatus to evenly and radially redistribute the total weight of a tire on its rim as the tire becomes worn or picks up extra weight in the way of debris from the pavement in order to prevent further uneven wear of the tire, to thereby extend its effective life, and assist in stabilizing the vehicle on which the balanced tire is mounted.

A primary overall object of this Invention is to provide an improved system of dynamic wheel balancing apparatus of traveling vehicles and especially automotive vehicles traveling at high rates of speed on wheels provided with pneumatic tires in order to reduce vibration that would ordinarily be precipitated by unbalanced wheels and thereby contribute to the smoothness of vehicle movement as well as minimizing vibration wear and tear on the tires and other parts of the vehicle.

Another object of the Invention is to provide dynamic wheel balancing apparatus that can be mounted in the central interior cavity of vehicle wheel rims designed to accomodate tubeless tires.

Still another object of the Invention is to provide an improved system of dynamic wheel balancing apparatus of such simplicity that it can be installed within tubeless tire wheel rims by the vehicle user without the aid of complicated tools and balancing instruments.

A further object of the Invention is to provide a system of dynamic balancing sphere-shaped weights made of a dense non-magnetic material so that the automotive balancing mechanism will not be caused to malfunction by momentary magnetic attraction between the balancing spheres or between the spheres and the automobile rim or between the spheres and a steel structure over which the vehicle may be passing.

A still further object of the Invention is to design and fabricate said improved dynamic wheel balancing apparatus of selected materials such that there is no wetting of the balancing spheres with respect to each other or with respect to any of the surfaces that the spheres may be able to come into contact with.

Still another object of this Invention is to mount the balancing apparatus around the axis of the wheel in a selected plane that vertically bisects the mass of the combination wheel and tire in order to provide improved balancing action in both horizontal and vertical planes.

These and other objects and advantages of this Invention will become apparent through consideration of the following description and appended claims in conjunction with the attached drawings in which:

DESCRIPTION OF THE SEVERAL VIEWS OF THE DRAWINGS

FIG. 1 is a cross-sectional plan view showing how the automobile wheel and tire balancing apparatus is selectively positioned in the channel on the outside of the wheel rim within the confines covered by the automobile tire so that the balancing apparatus and balancing action are placed in a plane that is at the mass center of the combination wheel and tire.

FIG. 2 is a sectional detail perspective view showing how one form of the automobile wheel and tire balancing apparatus is provided with a mounting foot that fits snugly within the channel of the outer surface of the wheel rim.

FIG. 3 is a perspective cut-away view of the improved automobile wheel and the balancing apparaus in its functioning position around the center of a wheel rim within the inflated tire air cavity with the balancing tube portion of the balancing apparatus being provided with a modified method of mounting or attachment to the outer wheel rim surface.

FIG. 4 is a detail perspective view of the modified version of said balancing apparatus in which the balancing tube is centered and attached to a selected position on the wheel rim exterior surface by means of a plurality of mounting blocks and showing a means by which a slip-on collar can be employed to join the two ends of tubular channel portion of the balancing apparatus.

FIG. 5 is a side elevational section view of the balancing apparatus mounted around the wheel rim illustrating how the rollable weight redistribution spheres and the low viscosity lubricating fluid settle to resting positions when the automobile wheel is not in motion.

FIG. 6 is a cross-sectional view of the balancing apparatus showing how one of the weight redistribution spheres acts to automatically even out wheel weight when the automobile is in motion.

FIG. 7 is a side elevation section view of the balancing apparatus illustrating how the weight redistribution spheres and the damping fluid ride on the outer edge of the encircling balancing tube due to the centrifugal motion imparted to the spheres and liquid by the motion of the automobile wheel to automatically balance and redistribute the weight of the wheel.

In describing one selected form or preferred embodiment of this Invention as shown in the drawings and described in this specification, specific terms and components are used for clarity. However, it is not intended to limit the claimed Invention to the specific form, components or construction shown and it is to be understood that the specific terms used in this illustration of the Invention are intended to include all technical equivalents which operate in a similar manner to accomplish a similar purpose.

DETAILED DESCRIPTION OF PREFERRED EMBODIMENT OF INVENTION

Referring to the specific embodiment of the Invention selected for illustration in the accompanying drawings, FIGS. 1, 3 and 4 illustrate the wheel balancing apparatus described herein mounted on three different kinds of vehicle rims for tubeless tires 19. The wheel rims illustrated in FIG. 1 and FIG. 4 are presently available commercial wheel rims while the wheel rim illustrated in FIG. 3 would be a specially fabricated wheel rim 31 provided with a longitudinal concave recess 32 specially designed to receive and hold the wheel balancing apparatus described herein. The type or configuration of wheel rim most commonly employed with modern tubeless tires is that illustrated in FIG. 1 and in FIG. 2 in which the rim is provided with a broad U-shaped throughway 12 centrally positioned with respect to the edges of the wheel rim and longitudinally disposed around the circumference of said wheel rim 11. This troughway 12 in rim 11 has a substantially flat bottom and makes a convenient place to mount the annular rim encircling balancing tube 13 portion of said improved balancing apparatus. For this reason one of the mounting techniques will employ a specially shaped foot 18 on one side of balancing tube 13 that is fabricated to just exactly fit into troughway 12 in rim 11.

In cases where the improved balancing apparatus is to be mounted on the outside surface of a wheel rim 21 having a broad and nearly flat transverse wheel rim surface 22 like that illustrated in FIG. 4, a completely circular balancing tube 23 can be employed and under such circumstances said annular rim encircling tube will be mounted in a selected central position on the surface of rim 21 by means of cardle shaped centering and mounting blocks 24—24 as illustrated in FIG. 4 of the drawings.

Starting with the embodiment of the Invention adapted for use with tubeless tire wheel rims 11 having a central troughway cavity 12, the Invention calls for a specially shaped semi-rigid elastic annular rim encircling balancing tube 13 to surround and be attached to the outer rim surface 14 of a conventional vehicle wheel in a position concentric with the hub of the wheel and positioned in a selected vertical plane dividing the mass off the complete wheel, rim and tire assembly into equal left and right masses. The distinctive exterior configuration feature of balancing tube 13 will be found in the provision of a pair of ears or flange extensions from spaced apart points on the outer circumference of balancing tube 13 to form a flange shaped centering and mounting foot 18 fabricated as an integral part of one side of said balancing tube such as to aid in securely attaching said balancing tube 13 to the outside surface of the wheel rim and being of such shape and size as to snugly fit into the central troughway cavity 12 found in the center of the outside surface of tubeless tire vehicle wheel rims of many motor vehicle wheels. Said annular rim encircling balancing tube 13 is further provided with a hollow circular cross-section passageway cavity 15 forming a tubular channel 15 disposed through the length of said elastic annular rim encircling balancing tube 13 suitable for free movement of a plurality of spheres therein.

In order to facilitate convenience of installation and to minimize development of electrostatic or electromagnetic charges on the inside surface 15 of balancing tube 13 or that could cause bunching of rollable spheres 16—16 at undesirable points along the interior surface 15 of the balancing tube, it is preferable to fabricate said balancing tube 13 out of an electrically non-conductive plastic material.

It should also be readily apparent that it would be exceptionally helpful to fabricate balancing tube 13 from a plastic that can be cast or extruded in such a manner as to produce a smooth non-stick interior surface so as to minimize sticking or bunching of the balancing spheres on rough or sticky spots on the interior walls of said balancing tube 13. In addition, performance might be further improved if the interior walls of balancing tube 13 were coated with a chemically neutral, non-wetting and non-stick material such as teflon. The Inventor has not been able to test the effectiveness of the teflon coating on the interior surfaces of the crude homemade balancing tubes that he has installed on his own car for testing purposes, but the Inventor has substantial reason to believe that such a teflon coating would produce a further increment of balancing efficiency.

During most of the twentieth century automobile era, experimenters whith dynamic wheel stabiliation devices have employed heavy metallic spherical weights such as shot pellets and metal ball bearings of various sizes as the circulating balancing weights in their various proposed structures and have used various kinds of light oil as a damping mobility medium. Since the surface of the balancing spheres 16—16 suffer some small amount of corrosion with the passage of time and said surfaces tend to become wetted and sticky by exposure to the damping fluids employed, said balancing spheres tend to bunch up and stick together and they stick together with increasing frequency and tenacity as the balancing weights are reduced in size and eexpose a larger wetted surface area to other balancing weights and as multiple weights become wedged in trying to pass a weight stuck to the side of the balancing tube. The structure called for in this enclosure proposes to minimize these problems by employing spherical balancing weights 16—16 of such large size that they cannot pass each other in tubular passageway 15 and employment of larger size spherical balancing weights arranged in "single file" in the confines of the balancing tube so that surface contact between spheres is limited to a short arc point contact with the preceding and following spherical weights.

In addition, this inventor's proposal attacks the bunching problem by proposing the employment of spherical balancing weights fabricated from glass or a plastic selected for its electrically neutral, chemically neutral and non-wetting properties relative to a selected non-wetting damping fluid to be employed as a mobility medium in said balancing tube 13. This invention, therefore, employs a plurality of rollable weight redistribution and balancing spheres 16—16 with each of said spheres being fabricated from an electrically non-conductive and non-megnatic selectic material such as glass or a heavy hard ceramic material that is also non-wettable by or with respect to the damping fluid that is to be employed in the balancing tube.

In addition each of said rollable weight redistribution and balancing sphere weights 16—16 should have a diameter smaller than the width of said hollow interior sphere passageway cavity 15 and of sufficient size that two of said rollable weight redistribution spheres cannot pass each other in the hollow interior sphere passageway 15 of rim encircling balancing tube 13. If steel or metal balancing weights are used, the metal weights will develop an electrical charge as the vehicle moves to a substantial speed and the weights spin with the wheels. Magnetic charges developing on balancing weights made from ferric metals can cause a jerk on the weight each time the wheel and weight pass an attracting metal object. Magnetic charges can cause metal balancing weights to be attracted or repelled from each other in a manner that interferes with the effectiveness of the balancing action. In addition electrostatic charges developing on metal balancing weights can produce high voltage electric arcs to nereby metal objects and to other balancing weights causing pitting and chemical deposits to build on the surface of the balancing weights. In time these increasing deposits mix with the damping fluids and become gummy and sticky causing weights to stick together and bunch up to the detriment of the desired balancing action. If, in some heavy duty truck applications and special situations, it is absolutely necessary that spherical weights 16—16 must be fabricated from lead or other metal in order to achieve the weight required, then said metal balancing weights should be coated with an electrically insulative non-wetting and non-sticking surfacing material such as teflon even though such materials are expensive and difficult to apply to spherically shaped objects. In instances where the mass of metal, steel or lead spherical balancing weights is needed, and teflon coated steel or teflon coated lead proves to be impractical or too expensive, a compromise choice that would retain a substantial portion of the features of this invention can be achieved by employing relative neutral non-ferric metal spheres 16—16 such as brass or bronze.

Effective dynamic balancing cannot be accomplished if the balancing weights must overcome the friction involved in rolling or sliding over the interior walls of the balancing tube so inventors in this field have traditionally employed a fluid medium in which said balancing weights could move more easily. This fluid medium has been traditionally called a damping fluid although damping was only a part of a function of the fluid and heavy oily fluids have often been used to increase the so called "damping action" at the expense of efficiency in the "balancing action." The balancing apparatus disclosed and proposed by this inventor calls for a quantity of low viscosity, non-wetting damping fluid 17, such as ethylene glycol, injected into the interior of said tubular passageway channel 15 in sufficient quantity such that the combined volume of the rollable weight balancing spheres 16—16 and the non-wetting damping fluid fill approximately two-thirds of the interior volume of said tubular passageway channel to provide a slightly damped mobility enhancing fluid medium in which the balancing spheres can move freely without sticking to each other or sticking to the interior wall of said tubular sphere passageway cavity. In order for the balancing apparatus to remain effective over a substantial period of time it should be clear that the selected damping fluid 17 should be non-polar with respect to both the material employed for the balancing tube and should also be non-polar with the material from which spherical balancing weights 16—16 are fabricated.

Without regard to the manner in which said annular rim encircling balancing tube is mounted on any of the variations in tubeless tire wheel rim structures, FIG. 5 of the Drawings, herein, provides an at rest illustration of the manner in which said balancing tube should be loaded with a plurality of rollable balancing weights 16—16 and a quantity of low viscosity non-wetting damping fluid 17 until the interior volume of balancing tube cavity 15 is 55 to 70% filled with a combination of weights and fluid. It will be readily appreciated by those skilled in this dynamic balancing art that by employing a larger or smaller number of balancing weights 16—16 or by increasing or decreasing the size and mass of the balancing weights employed, that the fabricator of the device can within a range adjust the vehicle speed at which optimum wheel balancing can be achieved. After the vehicle is in motion and rotary motion has been imparted to the wheels, said balancing weights 16—16 and the supply of damping fluid 17 are redistributed by centrifugal force in the manner illustrated in FIG. 7 of the Drawings. If the wheel and tire combination is perfectly balanced then balancing weights 16—16 will take up positions at points around the interior of balancing tube 13 that are equally distant from each other. However, if there is some flaw or extra mass at one or more points in the wheel or tire, or if the tire picks up one or more rocks that unbalance said wheel and cause it to wobble then said balancing weights automatically take up bunching positions that offset and neutralize the effect of the picked up spot weight and restores the wheel to balanced operation.

Transferring our attention to the embodiment of the invention adapted for mounting on wheel rims 21 having a broad, nearly flat outside rim surface 22 as illustrated in FIG. 4 of the Drawings, it should be realized that specially shaped balancing tube 13 with its mounting foot 18 could be mounted on rim surface 22 in the selected position by application of a suitable adhesive to the bottom of mounting foot 18. However, if may be somewhat simpler to devise templates or mounting guides for positioning rim encircling balancing tube 23 if a simple round balancing tube 23 is employed on rim surface 22 by means of a plurality of spaced apart cradle shaped centering and securing mounting blocks 24—24 that are arranged and adhesively attached in selected positions around the outer rim surface of a conventional tubeless tire wheel rim 21. The upper surface of said cradle shaped centering and mounting blocks 24—24 is provided with a concave cradling surface 25 having a concave arc contoured to conform with the arc formed by a part of the outside surface of annular rim encircling balancing tube 23 such that said balancing tube 23 fits snugly into said concave cradling surface 25 so that balancing tube 23 can be adhesively attached to surface 25 of mounting blocks 24—24 thereby providing a secure means of mounting balancing tube 23 in a selected central position on surface 22 of wheel rim 21.

Where professional equipment is available, the opposite ends 26—26 of balancing tube 23 can be brought together and secured by a butt weld or an adhesive butt joint to form said balancing tube 23 into an endless annular ring or a layman assembling and installing his own dynamic balancing apparatus from a boxed kit of parts and materials could use a close fitting sleeve-shaped, slip-on collar 27 adhesively secured in position joining and matching the two ends of said annular ring of flexible balancing tubing as illustrated in FIG. 4 of the drawings.

A factory assembled version of the wheel and tire balancing apparatus illustrated in FIG. 1 and in FIG. 2 would probably have the opposite ends of balancing tube 13 joined together by means of a professional butt weld or other appropriate butt joint. However, a layman or home installer of said balancing apparatus could pare back an inch or two of foot 18 to produce a circular outside surface at each end of balancing tube 13 to permit adhesive joinder of the two ends of said balancing tube 13 by the same type of sleeve-shaped, slip-on collar installed in the same manner as described in the preceding paragraph and illustrated in FIG. 4 of the Drawings.

When said sleeve-shaped, slip-on collar 27 is employed to join the opposite ends 26—26 of encircling balancing tube 23, a slight amount of extra weight will be added to one side of the wheel disrupting the balance of the wheel. The dynamic balancing apparatus could very adequately compensate for the added weight of the slip-on collar 27, but it is preferred that the full effect of the balancing apparatus be reserved for correcting the chance imbalancing incidents that occur on the highway. The extra weight of the slip-on collar 27 should therefore be compensated and counterbalanced by one or more annular slip-on collar counterbalancing weights 28—28 that are of the same general shape and the exact weight of said slip-on collar 27 and affixed in positions around the annular balancing tube to counterbalance and evenly distribute the weight of the slip-on collar 27.

The remaining critical aspects of the invention that are shared by all of the mounting embodiments of the invention call for fabrication of balancing tube 23 from a selected, neutral non-conductor plastic material, call for a plurality of rollable weight redistribution spherical balancing weights 16—16 fabricated from a selected neutral, non-wetting material and call for a quantity of low-viscosity, non-wetting damping fluid 17 selected to be non-polar with respect to the material employed for fabrication of balancing tube 23 and non-polar with respect to the materials from which spherical balancing weights 16—16 are fabricated as was more fully described for the previous embodiment of the invention.

The annular rim encircling balancing tube 23 that has a round circular cross-section may also be used in conjunction with a specially designed and fabricated pneumatic tire wheel rim 31 that is provided with a centrally positioned, longitudinally disposed concave recess 32 in the outside surface of the specially designed wheel rim 31. This central longitudinal concave recess 32 has a transverse concave arc that exactly matches the curve of the outside circumference of the elastic annular rim encircling balancing tube 23 such that the annular rim encircling tube 23 may snugly fit into said concave recess 32 of specially fabricated wheel rim 31 in a concentric position with the hub of the wheel and in a selected vertical plane that divides the total mass of the wheel, rim, and tire balancing assembly into equal masses.

The central longitudinal concave recess 32 is designed and adapted to firmly and snugly cradle and support the round rim encircling balancing tube 23 along the total length of the balancing tube so as to anchor the balancing tube 23 in place in a manner allowing a maximum amount of tube surface area available for bonding to the wheel rim 31. This method of tube mounting is substantially different from the method using a plurality of spaced apart cradle shaped securing and mounting blocks 24—24 that hold the rim encircling balancing tube 23 only at separate spaced apart intervals. In addition, employment of this central concave recess 32 submerges balancing tube 23 below the outer rim surface and the outer rim flange edges of the specially fabricated wheel rim 31 into a lowered position so as to not inhibit or interfere with the removing or mounting of an automobile tire on said wheel rim 31. The round cross-section rim encircling balancing tube 23 fabricated from a length of flexible tubing may have its free opposite ends 26—26 brought together around the specially designed wheel rim 31 and secured together by a butt weld or an adhesive butt joint or by means of a close fitting sleeve-shaped, slip-on collar 27 that is adhesively secured in position joining and matching the two ends of the flexible tubing to each other to form a continuous and endless annular rim encircling balancing tube 23 as described in the preceding paragraphs concerning factory and layman installed dynamic wheel balancing apparatus.

Except for the particular variation of mounting the annular rim encircling balancing tube 23, this embodiment utilizing a specially designed wheel rim 31 includes all of the critical aspects and features of the invention that are shared in common by all of the mounting embodiments of the invention which encompass the balancing tube 23 being made out of a neutral, non-conductive plastic material, the weight redistribution balancing spheres 16—16 made from a netural non-wetting material and a quantity of damping fluid that is non-polar and non-wetting with respect to the surrounding parts of the balancing apparatus as more completely discussed in descriptions of previous embodiments of this invention.

INSTALLATION AND OPERATION

In installing the dynamic wheel balancing apparatus described, the operator-user first removes the tubeless pneumatic tires from his automobile wheel rims and mounts the dynamic wheel and tire balancing apparatus on the outer surfaces of the rims according to the type of outside surface on his particular wheel rims. The balancing apparatus employing an annular rim encircling balancing tube 13 that is provided with a flange shaped centering and mounting foot 18 as an integral part of the balancing tube 13 is best used in conjunction with a wheel rim 11 that has a central troughway cavity 12 with a generally broad U-shaped cross-section that runs completely around the wheel rim 11. The balancing tube apparatus is firmly positioned and seated into place within this central troughway cavity 12 by stretching said elastic balancing tube 13 and working it over the circular edge of wheel rim 11 much in the same manner as in seating the bead of a tire, making sure that the flat surface of the flange shaped mounting foot 18 is firmly seated against the bottom of the U-shaped troughway cavity 12 and making certain that the left and right edges of mounting foot 18 firmly wedge said elastic encircling balancing tube 13 within the confines of the left and right side walls of said broad U-shaped troughway cavity 12.

Another common style of wheel rim 21 utilizes a broad, flat wheel rim outer surface 22 which makes it necessary for the consumer-user to center and permanently affix in line around the rim a plurality of cradle shaped centering and securing blocks 24—24 approximately halfway between the edges of the flat wheel rim. The exact center of the mass of the tire and rim does not always occur in the center of the outer surface of the wheel rim. It is therefore suggested that any dynamic wheel balancing apparatus installing kits for the use of a layman be provided with paper templates for each of the rim models maked with squares representing the cradle shaped centering blocks 24—24 to enable the layman to accurately and exactly position the cradle-shaped mounting blocks 24—24 on his particular model of wheel rim as he adhesively mounts each of said mounting blocks 24—24 into proper positions on said wheel rim surface 22. The upper surfaces of mounting blocks 24—24 are coated with an adhesive compound selected to securely bond plastic balancing tube 23 to mounting blocks 24—24. Then elastic encircling balancing tube 23 may be stretched over wheel rim 21 and placed on the cradling and mounting blocks 24—24 allowing the elasticity of the balancing tube to pull itself into a tight, taut position around the centering cradling blocks.

The consumer-user may prefer to use a wheel rim 31 that is provided with a specially fabricated centrally positioned and longitudinally disposed concave recess 32 that has a gradual concave curve that exactly matches the curvature of the outside surface of said elastic encircling balancing tube 23 forming in effect a "built-in" cradle structure that runs the entire circumference of the wheel rim to provide a central longitudinal recess 32 into which said balancing tube 23 may be securely seated.

The user will usually desire to permanently secure the elastic balancing tube 23 by gluing that portion of the outside surface of the balancing tube 23 that fits into and against the surface of concave recess 32 of specially designed wheel rim 31.

It should be readily apparent, however, that all of the alternative mounting arrangements recommended herein would be improved by being adhesively secured to the rim structure on which they are to be mounted since such adhesive security will absolutely prevent any shift in position that may occur as the automobile moves quickly from side to side. However, it is contemplated that the encircling balancing tube has enough of an elastic character to tightly pull the encircling tube around the circumference of the rim and tube mounting structure much in the way a tire may be stretched and "seated" within a rim and remain within the confines of the rim due to the elastic property of the pneumatic tire that pulls the tire back into shape after the tire is within the rim. If the consumer is using a annular rim encircling balancing tube 23 that is fabricated from a length of flexible tubing, he simple mounts the balancing tube 23 in the appropriate centered position on the mounting structure of whatever style of wheel rim he is using by wrapping the flexible tubing around the wheel rim and joining the two ends 26—26 together snugly around the outer rim surface by means of a butt joint or a sleeve-shaped slip-on collar 27 that exactly joins and matches the two ends of the flexible tubing.

After said dynamic wheel and tire balancing apparatus have been put on all four wheel rims, the pneumatic tires have been re-mounted on the rims and the rims fixed back on the axles, the dynamic wheel balancing apparatus are ready to automatically balance the rotary motion of the wheels to reduce tire wear and to greatly alleviate the wobbling and vibrating of an automobile as it travels over a roadway. When the dynamic wheel balancing apparatus is at rest the plurality of rollable weight redistribution and balancing spheres 16—16 and the quantity of low viscosity, non-wetting damping fluid 17 settle to the bottom of the encircling balancing tube as illustrated in FIG. 5 of the Drawings. As the car begins to accelerate and the wheels begin to rotate faster a centrifugal force is exerted upon the balancing spheres 16—16 and the damping fluid 17 which forces them to move outward away from the wheel axis. The automatic balancing principle begins to show its effects as the automobile reaches twenty-five to thirty miles per hour, depending upon the size and weight of the rollable balancing spheres 16—16, and the dynamic wheel balancing apparatus reaches maximum corrective effectiveness when the automobile is travelling at about 50 to 55 miles per hour.

As the weight of the tire becomes unbalanced due to uneven tread wear, improper inflation or adherence of debris from the roadway, the rollable weight redistribution balancing spheres 16—16 adjust their positions around the inside of the hollow circular cross-section passageway channel 15 to compensate for and counterbalance the added or subtracted weight that develops as the tire travels and ages as shown in FIG. 7. By shifting their positions within the rim encircling balancing tube, the rollable weight redistribution spheres 16—16 counterbalance and equalize the weights of the various sections of the wheel that rotate around the axle making the wheel run smoothly and evenly, eliminating the tendency for a very slightly out-of-balance wheel to begin to wobble, and creating a smoother ride for the automobile passengers. The weight balancing spheres 16—16 are able to move extremely quickly into new readjusted positions should a sudden shift in weight occur, such as the momentary adhesion of a patch of tar to the tire, because they are rolling in a low viscosity non-wetting fluid 17 that prevents the rolling balancing spheres 16—16 from sticking to each other or to the inside walls of the hollow passageway cavity channel 15. This non-wetting fluid 17 has just enough action damping properties to prohibit motion of the balancing spheres 16—16 toward each other at close range having the effect of inhibiting and cushioning balancing sphere impacts that could reduce the effectiveness of the desired balancing action of the balancing spheres 16—16 that would otherwise occur were it not for the low viscosity of fluid 17.

As may be seen in FIG. 6 the rollable balancing spheres 16—16 may also make side-to-side transverse weight adjustments within the circular cross-section passageway channel 15 to make lateral adjustments for uneven weight changes on one side or another of the tire.

The motion of the rotating wheels, as well as the ride of the passenger compartment, are further stabilized by the added gyroscopic effect of the additional mass of the rotating balancing spheres 16—16. Should the wheels of the automobile be suddenly braked and stopped for an emergency, the rollable weight redistribution spheres 16—16 will continue moving rapidly through the passageway cavity channel 15 for the time to maintain the gyroscopic effect and to keep the wheels from wobbling and involuntarily swerving during a sudden braking, performing like built-in anti-skid devices mounted within each wheel.

Although the dynamic wheel and tire balancing apparatus is protected on all sides by the automobile wheel rim flanges and the pneumatic tire, puncture damage may possibly occur to the elastic balancing tube. This trouble may be repaired by removing the tire from the rim, replenishing the supply of non-wetting damping fluid 17 in case some had leaked out and patching the puncture in the manner that one might repair a bicycle tire puncture.

ADVANTAGES OF THE INVENTION

In the foregoing description of the structure and operation of the Invention set forth herein, a number of advantages have been claimed for the apparatus and others will be readily apparent to persons skilled in the art.

One major advantage of the Invention is that it provides an improved wheel balancing apparatus that evenly and automatically redistributes the total weight of a tire on its rim not only radially but in a transverse side-to-side manner so that the tire and associated rotating structures and parts, being dynamically balanced in both vertical and horizontal planes, roll evenly and smoothly even as the tire becomes worn or picks up extra weight in the form of debris from the roadway thereby preventing further uneven wear on the tire, extending effective tire life and assisting in stabilizing the ride of the vehicle.

Another advantage of the Invention is that it provides an improved wheel balancing apparatus that may be properly fixed into place around the wheel rim by the consumer without any special training, knowledge or complicated balancing tools and that may be adequately fixed and repaired by the user should the wheel balancing apparatus suffer a puncture or leak in the elastic encircling tube.

Another important advantage of the Invention is that it provides a wheel balancing apparatus with weight redistribution and balancing spheres that cannot be wetted by the damping fluid thereby preventing the balancing spheres from sticking and adhering to each other or to the interior passageway of the annular encircling balancing tube which would inhibit the freedom and quick response of the balancing spheres.

Still another advantage of the Invention is that it provides a wheel balancing apparatus in which the balancing spheres were made of a dense non-magnetic material, such as glass or a ceramic material to prevent an imbalance malfunction from developing in the apparatus resulting from momentary magnetic attraction or deflection between the balancing spheres and the automobile wheel rim or a steel structure that the vehicle may be passing.

Another important advantage of the Invention is that it provides a dynamic wheel and tire balancing apparatus that is concentrically mounted around the axis of the wheel in a selected plane that precisely vertically bisects the mass of the combination wheel and tire in order for the rollable weight redistribution balancing spheres to have a maximum effect in compensating and remedying any imbalance that might occur in the wheel and the tire at any time.

Most automobile tire balancing devices require careful adjustment by an expert installer with elaborate equipment after each flat tire is replaced, while the dynamic wheel and tire balancing apparatus described in this invention will automatically compensate for maladjustments in the mounting without the necessity of incurring such balancing expenses with each tire change.

Although this specification describes but a single embodiment of the Invention with certain applications thereof, it should be understood that structural or material rearrangements of adequate or equivalent parts, substitutions of equivalent functional elements and other modifications in structure can be made and other applications devised without departing from the spirit and scope of my Invention. I therefore desire that the description and drawings herein be regarded as only an illustration of my Invention and that the Invention be regarded as limited only as set forth in the following claims, or as required by the prior art.

Having thus described my Invention I CLAIM:

1. An improved vehicle wheel and tire dynamic weight redistribution and balancing apparatus designed for user installation within the center space between parallel bead mounting flanges of a wheel rim for a tubeless pneumatic tire, said improved tire and wheel balancing apparatus comprising:
    A. A semi-rigid elastic annular rim encircling balancing tube to surround and be attached to the outer rim surface of a conventional vehicle wheel in a position concentric with the hub of the wheel and positioned in a selected vertical plane dividing the mass of the complete wheel, rim and tire assembly into equal left and right masses, said annular rim encircling balancing tube having
        1. a hollow circular cross-section passageway cavity forming a channel disposed through the length of said elastic annular rim encircling balancing tube suitable for free movement of a rollable sphere therein,
        2. said rim encircling balancing tube being fabricated from an electrically non-conductive plastic material; and
    B. a plurality of rollable weight redistribution and balancing spheres with
        1. each of said spheres being fabricated from a selected material, and
        2. each of said spheres having a diameter smaller than the width of said hollow interior sphere passageway cavity and of sufficient size that two of said rollable weight redistribution spheres cannot pass each other in said hollow interior sphere passageway where the spheres are to be inserted; and
    C. a quantity of low viscosity, non-wetting damping fluid, such as ethylene glycol, injected into the interior of said tubular passageway channel in sufficient quantity such that the combined volume of the rollable weight balancing spheres and the non-wetting damping fluid fill approximately two-thirds of the interior volume of said tubular passageway channel to provide a slightly damped mobility enhancing fluid medium in which the balancing spheres can move freely without sticking to each other or sticking to the interior wall of said tubular sphere passageway cavity.

2. The weight redistribution and wheel balancing apparatus as described in claim 1 together with rollable weight redistribution and balancing spheres fabricated from an electrically non-conductive and non-magnetic material, such as glass or a ceramic material, that is non-wettable by the damping fluid within said hollow tubular interior sphere passageway cavity.

3. The weight redistribution and wheel balancing apparatus as described in claim 1 in which the rollable weight redistribution spheres are provided with a slick, non-stick and non-wetting surface coating to facilitate the mobility of said rolling weight redistribution spheres within said hollow interior sphere passageway cavity and to prevent said balancing spheres from sticking to each other or sticking to the interior surface of the tubular channel portion of said balancing apparatus.

4. The weight distribution and wheel balancing apparatus as described in claim 1 in which the annular rim encircling balancing tube is fabricated from a length of flexible tubing with the two ends of said tubing joined together snugly around the outer rim surface of a conventional vehicle wheel by means of a sleeve-shaped, slip-on collar adhesively secured in position joining and matching the two ends of the said flexible tubing.

5. The weight redistribution and wheel balancing apparatus described in claim 1 together with rollable weight redistribution and balancing spheres fabricated from metallic material.

6. The weight redistribution and wheel balancing apparatus as described in claim 5 in which the metallic rollable weight redistribution spheres are provided with an electrically insulative slick, non-stick and non-wetting surface coating such as teflon to facilitate the mobility of said rollable weight redistribution spheres within said hollow interior sphere passageway cavity and to prevent said balancing spheres from sticking to each other or sticking to the interior surface of the tubular channel portion of said balancing apparatus.

7. The weight redistribution and wheel balancing apparatus described in claim 1 together with rollable weight redistribution and balancing spheres fabricated from a metallic and non-magnetic material, such as bronze, that is non-wettable by the damping fluid within said hollow tubular interior sphere passageway cavity.

8. An improved vehicle wheel and tire dynamic weight redistribution and balancing apparatus designed for factory or user installation within the central longitudinal groove-way cavity of the wheel rim for a tubeless pneumatic tire, said improved tire and wheel balancing apparatus comprising:

A. a semi-rigid elastic annular rim encircling balancing tube to surround and be attached to the outer rim surface of a conventional vehicle wheel in a position concentric with the hub of the wheel and positioned in a selected vertical plane dividing the mass of the complete wheel, rim and tire assembly into equal left and right masses, said annular rim encircling balancing tube having
1. a hollow circular cross-section passageway cavity forming a channel disposed through the length of said elastic annular rim encircling balancing tube suitable for free movement of a rollable sphere therein,
2. said rim encircling balancing tube being fabricated from an electrically non-conductive plastic material; and B. a flange shaped centering and mounting foot fabricated as an integral part of one side of said tubular shaped channel such as to aid in securely attaching said tubular balancing channel to the outside surface of the wheel rim and being of such shape and size as to snugly fit into the channel groove found in the center of the outside surface of tubless tire vehicle wheel rims of many motor vehicle wheels;

C. a plurality of rollable weight redistribution and balancing spheres with
1. each of said spheres being fabricated from a selected material, and
2. each of said spheres having a diameter smaller than the width of said hollow interior sphere passageway cavity and of sufficient size that two of said rollable weight redistribution spheres cannot pass each other in said hollow interior sphere passageway where the spheres are to be inserted; and D. a quantity of low viscosity, non-wetting damping fluid, such as ethylene glycol, injected into the interior of said tubular passageway channel in sufficient quantity such that the combined volume of the rollable weight balancing spheres and the non-wetting damping fluid fill approximately two-thirds of the interior volume of said tubular passageway channel to provide a slightly damped mobility enhancing fluid medium in which the balancing spheres can move freely without sticking to each other or sticking to the interior wall of said tubular sphere passageway cavity.

9. The weight redistribution and wheel balancing apparatus as described in claim 8 together with rollable weight redistribution and balancing spheres fabricated from an electrically non-conductive and non-magnetic material, such as glass or a ceramic material, that is non-wettable by the damping fluid within said hollow tubular interior sphere passageway cavity.

10. The weight redistribution and wheel balancing apparatus as described in claim 8 in whwich the rollable weight redistribution spheres are provided with a slick, non-stick and non-wetting surface coating to facilitate the mobility of said rolling weight redistribution spheres within said hollow interior sphere passageway cavity and to prevent said balancing spheres from sticking to each other or sticking to the interior surface of the tubular channel portion of said balancing apparatus.

11. The weight distribution and wheel balancing apparatus as described in claim 8 in which the annular rim encircling balancing tube is fabricated from a length of flexible tubing with the two ends of said tubing joined together snugly around the outer rim surface of a conventional vehicle wheel by means of a sleeve-shaped, slip-on collar adhesively secured in position joining and matching the two ends of the said flexible tubing.

12. The weight redistribution and wheel balancing apparatus described in claim 8 together with rollable weight redistribution and balancing spheres fabricated from a metallic material.

13. The weight redistribution and wheel balancing apparatus described in claim 12 in which the metallic rollable weight redistribution spheres are provided with an electrically insulative slick, non-stick and non-wetting surface coating such as teflon to facilitate the mobility of said rollable weight redistribution spheres within said hollow interior sphere passageway cavity and to prevent said balancing spheres from sticking to each other or sticking to the interior surface of the tubular channel portion of said balancing apparatus.

14. The weight redistribution and wheel balancing apparatus described in claim 8 together with rollable weight redistribution and balancing spheres fabricated from a metallic and non-magnetic material, such as bronze, that is non-wettable by the damping fluid within said hollow tubular interior sphere passageway cavity.

15. An improved vehicle wheel and tire dynamic weight redistribution and balancing apparatus designed for user installation within the central longitudinal center space between parallel bead mounting flanges of a wheel rim for a tubeless pneumatic tire, said improved tire and wheel balancing apparatus comprising:

A. a semi-rigid elastic annular rim encircling balancing tube to surround and be attached to the outer rim surface of a conventional tubeless tire vehicle wheel in a position concentric with the hub of the wheel and positioned in a selected vertical plane dividing the mass of the complete wheel, rim and tire assembly into equal left and right masses, said annular rim encircling balancing tube having
  1. a hollow circular cross-section passageway cavity forming a channel disposed through the length of said elastic annular rim encircling balancing tube suitable for free movement of a rollable sphere therein,
  2. said rim encircling balancing tube being fabricated from an electrically non-conductive plastic material; and
B. a plurality of spaced apart cradle shaped centering and securing mounting blocks that are arranged and attached in selected positions around the outer rim surface of a conventional tubeless tire wheel rim with the upper concave cradling surface contoured to conform with the arc formed by part of the annular rim encircling tube to provide a secure means of centrally mounting said annular rim encircling tube;
C. a plurality of rollable weight redistribution and balancing spheres with
  1. each of said spheres being fabricated from a selected material, and
  2. each of said spheres having a diameter smaller than the width of said hollow interior sphere passageway cavity and of sufficient size that two of said rollable weight redistribution spheres cannot pass each other in said hollow interior sphere passageway where the spheres are to be inserted; and
D. a quantity of low viscosity, non-wetting damping fluid, such as ethylene glycol, injected into the interior of said tubular passageway channel in sufficient quantity such that the combined volume of the rollable weight balancing spheres and the non-wetting damping fluid fill approximately two-thirds of the interior volume of said tubular passageway channel to provide a slightly damped mobility enhancing fluid medium in which the balancing spheres can move freely without sticking to each other or sticking to the interior wall of said tubular sphere passageway cavity.

16. The weight redistribution and wheel balancing apparatus as described in claim 15 together with rollable weight redistribution and balancing spheres fabricated from an electrically non-conductive and non-magnetic material, such as glass or a ceramic material, that is non-wettable by the damping fluid within said hollow tubular interior sphere passageway cavity.

17. The weight redistribution and wheel balancing apparatus as described in claim 15 in which the rollable weight redistribution spheres are provided with a slick, non-stick and non-wetting surface coating to facilitate the mobility of said rolling weight redistribution spheres within said hollow interior sphere passageway cavity and to prevent said balancing spheres from sticking to each other or sticking to the interior surface of the tubular channel portion of said balancing apparatus.

18. The weight distribution and wheel balancing apparatus as described in claim 15 in which the annular rim encircling balancing tube is fabricated from a length of flexible tubing with the two ends of said tubing joined together snugly around the outer rim surface of a conventional vehicle wheel by means of a sleeve-shaped, slip-on collar adhesively secured in position joining and matching the two ends of the said flexible tubing.

19. The weight redistribution and wheel balancing apparatus described in claim 15 together with rollable weight redistribution and balancing spheres fabricated from a metallic material.

20. The weight redistribution and wheel balancing apparatus described in claim 19 in which the metallic rollable weight redistribution spheres are provided with an electrically insulative slick, non-stick and non-wetting surface coating such as teflon to facilitate the mobility of said rollable weight redistribution spheres within said hollow interior sphere passageway cavity and to prevent said balancing spheres from sticking to each other or sticking to the interior surface of the tubular channel portion of said balancing apparatus.

21. The weight redistribution and wheel balancing apparatus described in claim 15 together with rollable weight redistribution and balancing spheres fabricated from a metallic and non-magnetic material, such as bronze, that is non-wettable by the damping fluid within said tubular interior sphere passageway cavity.

22. Improved vehicle wheel and tire dynamic weight redistribution and balancing apparatus designed for either factory installation or for user installation within the central longitudinal center space between parallel bead mounting flanges of a wheel rim for a tubeless pneumatic tire, said improved tire and wheel balancing apparatus comprising:
A. a specially fabricated wheel rim provided with a centrally positioned and longitudinally disposed concave recess in the outside surface of said vehicle wheel rim;
B. a semi-rigid elastic annular rim encircling balancing tube to surround, attach to, and firmly seat within the central longitudinal concave recess provided in the outer rim surface of a vehicle wheel in a position concentric with the hub of the wheel and positioned in a selected vertical plane dividing the mass of the complete wheel, rim and tire assembly into equal left and right masses, said annular rim encircling balancing tube having
  1. an outside circumference size and shape to snugly fit into the longitudinal concave recess provided in the wheel rim surface,
  2. a hollow circular cross section passageway cavity forming a channel disposed through the length of said elastic annular rim encircling tube suitable for free movement of a rollable sphere therein,
  3. said rim encircling tube being fabricated from an electrically non-conductive plastic material; and
C. a plurality of rollable weight redistribution and balancing spheres with
  1. each of said spheres being fabricated from a selected material, and
  2. each of said spheres having a diameter smaller than the width of said hollow interior sphere passageway cavity and of sufficient size that two of said rollable weight redistribution spheres cannot pass each other in said hollow interior sphere passageway where the spheres are to be inserted; and
D. a quantity of low viscosity, non-wetting damping fluid, such as ethylene glycol, injected into the interior of said tubular passageway channel in sufficient quantity such that the combined volume of the rollable weight balancing spheres and the non-wetting damping fluid fill approximately two-thirds of the interior volume of said tubular passageway channel to provide a slightly damped mobility enhancing fluid medium in which the balancing spheres can move freely without sticking to each other or sticking to the interior wall of said tubular sphere passageway cavity.

23. The weight redistribution and wheel balancing apparatus as described in claim 22 together with rollable weight redistribution and balancing spheres fabricated from an electrically non-conductive and non-magnetic material, such as glass or a ceramic material, that is non-wettable by the damping fluid within said hollow tubular interior sphere passageway cavity.

24. The weight redistribution and wheel balancing apparatus as described in claim 22 in which the rollable weight redistribution spheres are provided with a slick, non-stick and non-wetting surface coating to facilitate the mobility of said rolling weight redistribution spheres within said hollow interior sphere passageway cavity and to prevent said balancing spheres from sticking to each other or sticking to the interior surface of the tubular channel portion of said balancing apparatus.

25. The weight redistribution and wheel balancing apparatus descrbed in claim 22 together with rollable weight redistribution and balancing spheres fabricated from a metallic material.

26. The weight redistribution and wheel balancing apparatus described in claim 25 in which the metallic rollable weight redistribution spheres are provided with an electrically insulative slick, non-stick and non-wetting surface coating such as teflon to facilitate the mobility of said rollable weight redistribution spheres within said hollow interior sphere passageway cavity and to prevent said balancing spheres from sticking to each other or sticking to the interior surface of the tubular channel portion of said balancing apparatus.

27. The weight redistribution and wheel balancing apparatus described in claim 22 together with rollable weight redistribution and balancing spheres fabricated from a metallic and non-magnetic material, such as bronze, that is non-wettable by the damping fluid within said said hollow tubular interior sphere passageway cavity.

28. The weight distribution and wheel balancing apparatus as described in claim 22 in which the annular rim encircling balancing tube is fabricated from a length of flexible tubing with the two ends of said tubing joined together snugly around the outer rim surface of a conventional vehicle wheel by means of a sleeve-shaped, slip-on collar adhesively secured in position joining and matching the two ends of the said flexible tubing.

29. A combination "do-it-yourself" kit of parts and materials for user installation of an improved vehicle wheel and tire dynamic weight redistribution and balancing apparatus within the central longitudinal center space between parallel bead mounting flanges of a vehicle wheel rim for a tubeless pneumatic tire, said "do-it-yourself" wheel balancing kit comprising:

A. a semi-rigid elastic annular rim encircling balancing tube to surround and be attached to the outer rim surface of a conventional tubeless tire vehicle wheel in a position concentric with the hub of the wheel and positioned in a selected vertical plane dividing the mass of the complete wheel, rim and tire assembly into equal left and right masses, said annular rim encircling balancing tube having
1. a hollow circular cross-section passageway cavity forming a channel disposed through the length of said elastic annular rim encircling balancing tube suitable for free movement of a rollable sphere therein.
2. said rim encircling balancing tube being fabricated from an electrically non-conductive plastic material; and B. a flexible tape template strip of such size as to snugly fit within the central longitudinal center space between the mounting flanges of said wheel rim for a tubeless pneumatic tire with said template being provided with spaced apart shaped apertures to serve as mounting and positioning guides for a plurality of mounting blocks;

C. a plurality of spaced apart cradle shaped centering and securing mounting blocks that are arranged and attached in selected positions around the outer rim surface of a conventional tubeless tire wheel rim with each of said mounting blocks
1. being mounted through one of the aperture openings in the template strip previously applied to the outside central surface of the wheel rim, and
2. each of said mounting blocks being provided with a shaped concave upper cradling surface contoured to conform with the arc formed by part of the annular rim encircling tube to provide a secure means of centrally mounting said annular rim encircling tube;

D. a plurality of rollable weight redistribution and balancing spheres with
1. each of said spheres being fabricated from a selected material, and
2. each of said spheres having a diameter smaller than the width of said hollow interior sphere passageway cavity and of sufficient size that two of said rollable weight redistribution spheres cannot pass each other in said hollow interior sphere passageway where the spheres are to be inserted; and E. an injection chamber of low viscosity, non-wetting damping fluid, such as ethylene glycol, that is to be injected into the interior of said tubular passageway channel in sufficient quantity such that the combined volume of the rollable weight balancing spheres and the non-wetting damping fluid fill approximately two-thirds of the interior volume of said tubular passageway channel to provide a slightly damped mobility enhancing fluid medium in which the balancing spheres can move freely without sticking to each other or sticking to the interior wall of said tubular sphere passageway cavity;

F. together with an illustrated instruction folder supplying suggestions and plans by which the purchaser of the kit can install said improved wheel and tire balancing apparatus on his own vehicle wheel rims.

30. The weight redistribution and wheel balancing apparatus described in claim 29 together with rollable weight redistribution and balancing spheres fabricated from an electrically non-conductive and non-magnetic material, such as glass or a ceramic material, that is non-wettable by the damping fluid within said hollow tubular interior sphere passageway cavity.

31. The weight redistribution and wheel balancing apparatus described in claim 29 together with rollable weight redistribution and balancing spheres fabricated from a metallic material.

32. The weight redistribution and wheel balancing apparatus described in claim 31 in which the metallic rollable weight redistribution spheres are provided with an electrically insulative slick, non-stick and non-wetting surface coating such as teflon to facilitate the mobility of said rolling weight redistribution spheres within said hollow interior sphere passageway cavity and to prevent said balancing spheres from sticking to each other or sticking to the interior surface of the tubular channel portion of said balancing apparatus.

33. The weight redistribution and wheel balancing apparatus described in claim 29 together with rollable weight redistribution and balancing spheres fabricated from a metallic and non-magnetic material, such as bronze, that is non-wettable by the damping fluid within said hollow tubular interior sphere passageway cavity.

34. The weight distribution and wheel balancing apparatus described in claim 29 in which the annular rim encircling balancing tube is fabricated from a length of flexible tubing with the two ends of said tubing joined together snugly around the outer rim surface of a conventional vehicle wheel by means of a sleeve-shaped, slip-on collar adhesively secured in position joining and matching the two ends of the said flexible tubing.

* * * * *

UNITED STATES PATENT OFFICE
CERTIFICATE OF CORRECTION

Patent No. 3,913,980  Dated October 21, 1975

Inventor(s) Albert H. Cobb, Sr.

It is certified that error appears in the above-identified patent and that said Letters Patent are hereby corrected as shown below:

In the heading Item (76) Inventor, "Albert H. Cobb, Jr. 5515 Slattery Drive, San Antonio, Tex. 78240" should read -- Albert H. Cobb, Sr. 8715 Tallwood Drive, Austin, Tex. 78759 --.

Signed and Sealed this thirtieth Day of March 1976

[SEAL]

Attest:

RUTH C. MASON  
Attesting Officer

C. MARSHALL DANN  
Commissioner of Patents and Trademarks